United States Patent
Ragona et al.

(10) Patent No.: US 9,966,855 B2
(45) Date of Patent: May 8, 2018

(54) SYSTEMS AND METHODS FOR REAL-TIME INDUCTOR CURRENT SIMULATION FOR A SWITCHING CONVERTER

(71) Applicant: Texas Instruments Incorporated, Dallas, TX (US)

(72) Inventors: Scott E. Ragona, Bethlehem, PA (US); Rengang Chen, Hellertown, PA (US); David Jauregui, Bethlehem, PA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 484 days.

(21) Appl. No.: 14/518,776

(22) Filed: Oct. 20, 2014

(65) Prior Publication Data

US 2015/0097539 A1 Apr. 9, 2015

Related U.S. Application Data

(63) Continuation-in-part of application No. 13/327,146, filed on Dec. 15, 2011, now Pat. No. 8,866,464.

(60) Provisional application No. 61/950,443, filed on Mar. 10, 2014.

(51) Int. Cl.
*H02M 3/158* (2006.01)
*H02M 1/00* (2006.01)

(52) U.S. Cl.
CPC .. *H02M 3/1588* (2013.01); *H02M 2001/0009* (2013.01); *Y02B 70/1466* (2013.01)

(58) Field of Classification Search
CPC .. H02M 3/156; H02M 3/1588; H02M 3/1584; H02M 3/158; H02M 3/157; H02M 3/33507; H02M 3/1563; H02M 2001/0012; H02M 2001/0032; H02M 2001/0009; H02M 2001/0025; Y02B 70/1466
USPC .......................................... 323/282–286, 288
See application file for complete search history.

(56) References Cited

U.S. PATENT DOCUMENTS

| 5,907,233 | A | * | 5/1999 | Jabaji ...................... H02J 7/163 322/28 |
| 6,377,032 | B1 | | 4/2002 | Andruzzi et al. |
| 6,381,159 | B2 | | 4/2002 | Oknaian et al. |
| 6,528,976 | B1 | * | 3/2003 | Lenk ................... H02M 3/1588 323/224 |
| 6,930,474 | B2 | | 8/2005 | Wang |

(Continued)

*Primary Examiner* — Jue Zhang
*Assistant Examiner* — Kevin H Sprenger
(74) *Attorney, Agent, or Firm* — Tuenlap D. Chan; Charles A. Brill; Frank D. Cimino

(57) ABSTRACT

A switching converter having a high-side switching transistor and a low-side switching transistor and an inductor, having a circuit for generating a simulated waveform representing a sawtooth inductor current waveform. A circuit for monitoring and voltage at a switch node between the high-side and low-side transistors to determine a time during which the inductor current is increasing and a time during which the inductor current is decreasing wherein voltage across the low-side transistor when it is conducting represents a first portion of the simulated sawtooth inductor current waveform. A circuit for utilizing the time when the inductor current is increasing, the time when the inductor current is decreasing and the voltage across the low-side transistor when it is conducting to generate a portion of the simulated inductor current waveform when the high-side transistor is conducting. A method and a power supply utilizing this circuit are also disclosed.

6 Claims, 4 Drawing Sheets

(56) References Cited

U.S. PATENT DOCUMENTS

| | | |
|---|---|---|
| 7,019,504 B2 | 3/2006 | Pullen et al. |
| 7,119,522 B1 | 10/2006 | Tomiyoshi |
| 7,372,241 B1 | 5/2008 | Tomiyoshi |
| 7,777,472 B2 | 8/2010 | Uehara |
| 7,940,034 B2 * | 5/2011 | Pelz .................. H03K 17/0822 323/283 |
| 8,334,682 B2 | 12/2012 | Chiu et al. |
| 2008/0297957 A1 * | 12/2008 | Mehas .................. H02M 1/32 361/18 |
| 2009/0315527 A1 | 12/2009 | Kung et al. |
| 2012/0229107 A1 | 9/2012 | Chen et al. |

* cited by examiner

SYSTEMS AND METHODS FOR REAL-TIME INDUCTOR CURRENT SIMULATION FOR A SWITCHING CONVERTER

CROSS-REFERENCE TO RELATED APPLICATIONS

This application is a continuation-in-part of U.S. Nonprovisional patent application Ser. No. 13/327,146, filed Dec. 15, 2011 (which will issue as U.S. Pat. No. 8,866,464), and claims priority from U.S. Provisional Application No. 61/950,443, filed Mar. 10, 2014 both of which are hereby incorporated by reference in their entirety for all purposes.

TECHNICAL FIELD

The present invention relates generally to electronics, and specifically to systems and methods for regulating a switching converter.

BACKGROUND

Switching regulators have been implemented as an efficient mechanism for providing a regulated output in power supplies. One such type of regulator is known as a switching supply circuit, which controls the flow of power to a load by controlling the "ON" and "OFF" duty-cycle of one or more high-side switches coupled to the load.

Many different classes of switching supplies exist today. One type of switching supply circuit is known as a synchronous switching supply circuit. In a synchronous switching supply circuit, an inductor is used to maintain current flow that is switched from two separate sources. The two sources can include a high-side switch, such as a high-side field-effect transistor (FET), and a low-side switch, such as a low-side FET. After the high-side FET is deactivated, the low-side FET becomes activated. The low-side FET thus conducts current from ground to the inductor because magnetic power stored in the inductor dissipates to force current through the inductor by changing the voltage of the inductor source node to negative relative to ground. In this way, current continuously flows through the inductor, even at times when the high-side switch is deactivated.

It is desirable in the design of switching supplies to ensure that the output of the switching supply circuit is properly regulated. For example, if a load at the output of the switching supply circuit changes, it may be necessary to change the switching operation, such as by adjusting the switching duty-cycle, to regulate the output voltage to a relatively constant level. Regulation is typically accomplished through feedback control, by either a voltage feedback technique, in which the output voltage of the switching supply is monitored, or a current feedback technique, in which both the output voltage and the inductor current are monitored. The current feedback technique can monitor the inductor current by connecting a current sense resistor in series with the output inductor. However, a resistor connected in series with the output inductor can result in a degradation of the performance efficiency of the switching supply circuit.

Another way to accomplish the current feedback technique is by employing inductor direct current resistance (DCR) sensing, which is determining the inductor current by measuring the voltage drop across the parasitic resistance of the inductor. However, DCR sensing has several pitfalls, such as requiring external temperature compensation, dealing with large DCR tolerances that limit overall accuracy, the need to have additional routing from the integrated circuit to power components and the inability to utilize minimum DCR inductors to preserve signal integrity.

SUMMARY

In an aspect in a switching converter having a high-side switching transistor and a low-side switching transistor and an inductor, a circuit for generating a simulated waveform representing a sawtooth inductor current waveform. A circuit for monitoring voltage at a switch node between the high-side and low-side transistors determines a time during which the inductor current is increasing and a time during which the inductor current is decreasing wherein voltage across the low-side transistor when it is conducting represents a first portion of the simulated sawtooth inductor current waveform. A circuit for utilizing the time when the inductor current is increasing, the time when the inductor current is decreasing and the voltage across the low-side transistor when it is conducting to generate a portion of the simulated inductor current waveform when the high-side transistor is conducting.

Another aspect includes a method of operating a switching converter having a high-side switching transistor and a low-side switching transistor and an inductor and having a circuit for generating a simulated waveform representing a sawtooth inductor current waveform. Monitoring a voltage at a switch node between the high-side and low-side transistors to determine a time during which the inductor current is increasing and a time during which the inductor current is decreasing wherein voltage across the low-side transistor when it is conducting represents a first portion of the simulated sawtooth inductor current waveform. Utilizing the time when the simulated inductor current waveform is increasing, the time when the simulated inductor current waveform is decreasing and the voltage across the low-side transistor when is conducting to generate a portion of the simulated inductor current waveform when the high-side transistor is conducting.

A further aspect includes a power supply including a switching converter having a high-side switching transistor, a low-side switching transistor, an inductor and a control circuit for implementing current control of the power supply. A circuit for monitoring a voltage at a switch node between the high-side and low-side transistors to determine a time during which the inductor current is increasing and a time during the inductor current is decreasing wherein the voltage across the low-side transistor when it is conducting represents a first portion of a simulated sawtooth inductor current waveform. The control circuit utilizing the time when the inductor current is increasing, the time when the inductor current is decreasing and the voltage across the low-side transistor when it is conducting to generate a portion of the simulated inductor current waveform when the high-side transistor is conducting, the control circuit implementing current control of the power supply output.

DETAILED DESCRIPTION

Systems and methods are provided for regulating a power supply. The systems and methods provide a simulated inductor waveform as a feedback signal to the controller of a switching converter based on a low-side output waveform of a low-side transistor measured at a switching node during off-times of the switching converter. An amplified, inverted version of the low-side output waveform can be employed to determine a high-side portion of the simulated inductor waveform during on-times of the switching converter. The simulated inductor waveform is a real time signal representation of an actual output inductor current and eliminates the need for inductor direct current resistance (DCR) sensing. The systems and methods also eliminate the need for external temperature compensation, allow for the use of low DCR inductors that improve overall efficiency, and allow for more accurate cycle-by-cycle regulation and improved load transient responses.

Figure 1:
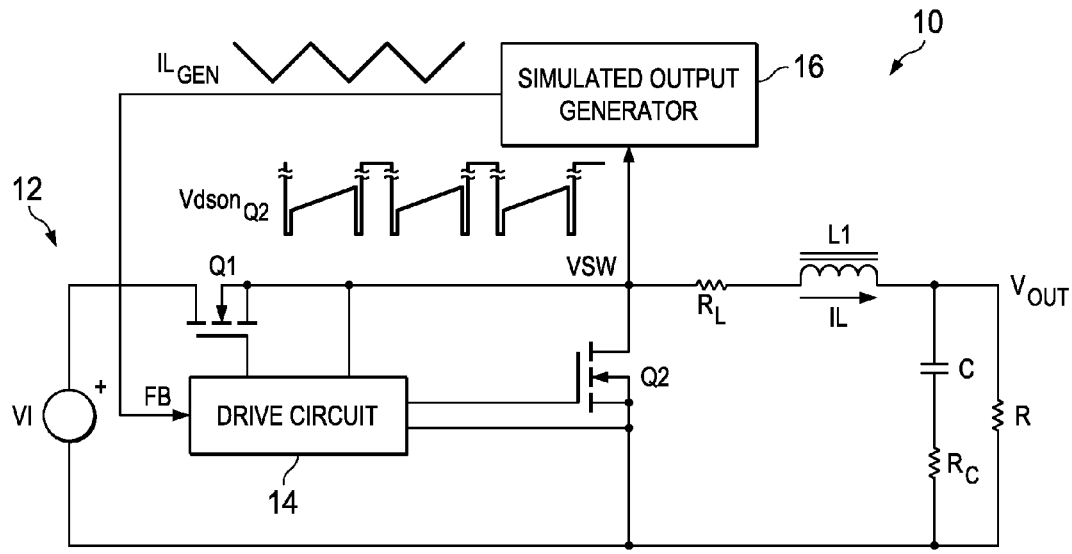
FIG. 1 illustrates a power supply system that includes a switching supply circuit and a simulated output generator in accordance with an aspect of the present invention.

FIG. 1 illustrates a power supply system 10 that includes a switching supply circuit 12 and a simulated output generator 16 in accordance with an aspect of the present invention. The switching supply circuit 12 could be, for example, a synchronous buck or a synchronous boost converter, and could be a self-oscillating or a fixed-frequency pulse-width modulation regulator. The switching supply circuit 12 includes a driver control circuit 14 that controls the operation of a high-side field-effect transistor (FET) Q1 and a low-side FET Q2. The high-side FET Q1 and the low-side FET Q2 are demonstrated in the example of FIG. 1 as N-type FETs. However, other types of transistors could be used in accordance with an aspect of the invention. The high-side FET Q1 is interconnected between a positive voltage rail VI at a drain terminal and a switching node VSW at a source terminal. The low-side FET Q2 is interconnected between the switching node VSW at a drain terminal and a negative voltage rail at a source terminal, the negative voltage rail being demonstrated as ground in the example of FIG. 1. The driver control circuit 14 thus controls the voltage potential at the switching node VSW by alternately switching between opposing "ON" and "OFF" states of the high-side FET Q1 and the low-side FET Q2. It is to be understood that the opposing switching of the high-side FET Q1 and of the low side FET Q2 is such that only one of the high-side FET Q1 and the low side FET Q2 may be activated at a given time to avoid a short circuit between the positive rail VI and ground.

The switching supply circuit 12 also includes an output inductor L1 coupled to the switching node VSW through a load resistor RL. The output inductor L1 is interconnected between the switching node VSW and the output VOUT of the switching supply circuit 12, the output VOUT being coupled to ground by a series connected resistor RC and capacitor C both coupled in parallel with resistor R. The output inductor L1 maintains current IL flowing to the output of the switching supply circuit 12, as described above. Because the load at the output of the switching supply circuit 12 may change in response to the operation of other circuit components to which the switching supply circuit 12 is supplying power, the output of the switching supply circuit 12 needs to be regulated to maintain relatively constant output voltage VOUT. Accordingly, the switching supply circuit 12 includes a simulated output generator 16 that supplies feedback to the driver control circuit 14, the feedback being a simulated output signal that is proportional to the output current signal IL.

The simulated output generator 16 receives inputs from the switching node VSW during activation of the low-side FET Q2 and deactivation of the high-side FET Q1 (referred to as off-times), and measures a low-side output waveform of the low-side FET Q2, which could be a voltage waveform (VdsonQ2) across the low-side FET. The simulated output generator 16 then generates a simulated inductor current waveform (ILGEN) that is proportional to the inductor output current IL by employing an amplified, inverted version of the low-side output waveform and determining a high-side portion (referred to as the "on-time") of the simulated inductor current waveform utilizing the slope and minimum values of the amplified, inverted low-side output waveform. Alternatively, the simulated output signal could be a voltage waveform that corresponds approximately to the output current IL. It is to be appreciated that the simulated output generator 16 can amplify and temperature compensate the low-side output waveform. The driver control circuit 14 receives the simulated output signal as feedback for the purpose of regulating the output voltage VOUT, for example, by controlling the amount of time (e.g., duty-cycle) that the high-side FET Q1 is "ON" relative to the low-side FET Q2.

Figure 2:
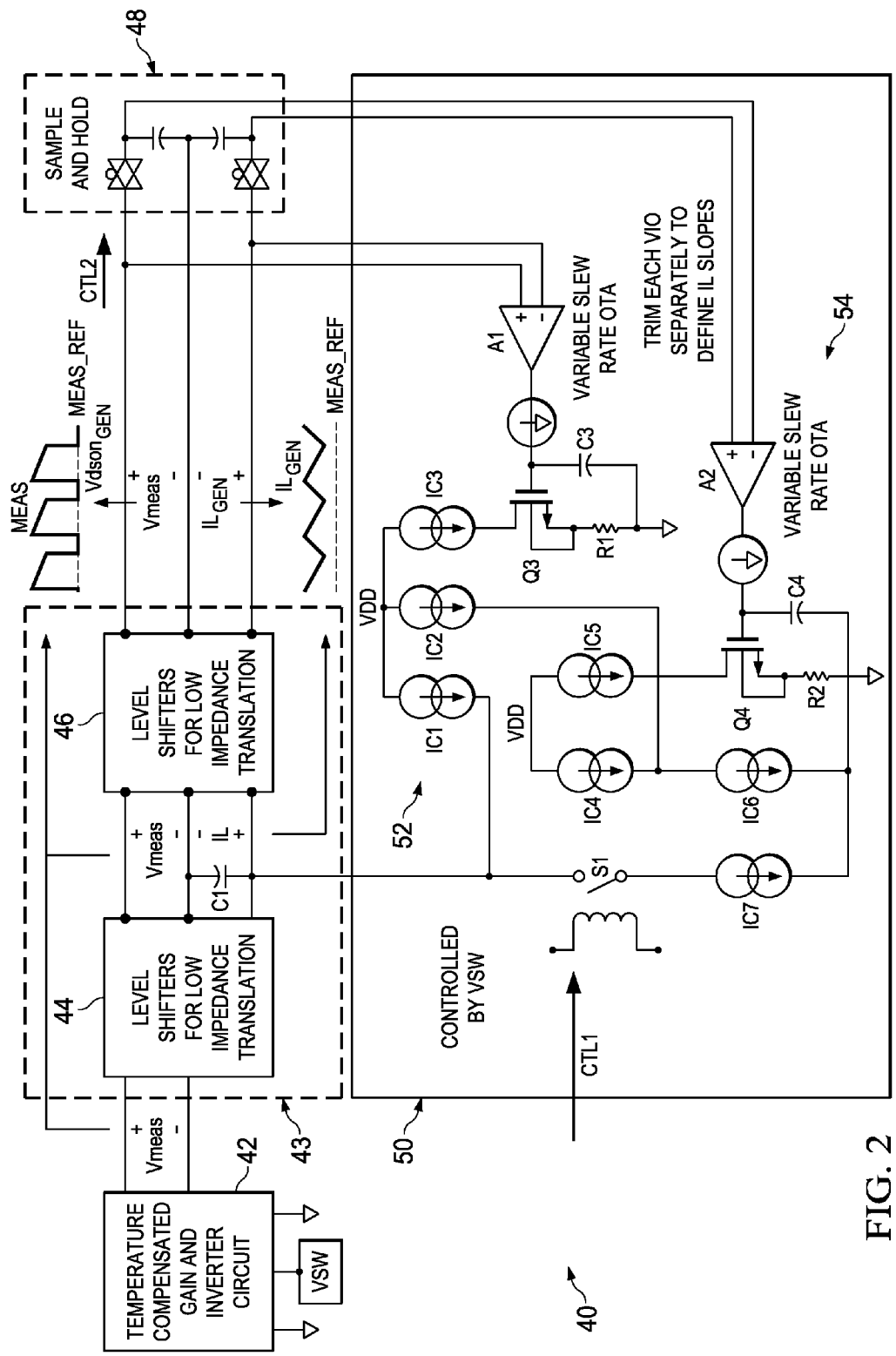
FIG. 2 illustrates an example of a simulated output generator in accordance with an aspect of the present invention.

FIG. 2 illustrates an example of a simulated output generator 40 in accordance with an aspect of the present invention. The simulated output generator 40 includes a temperature compensated gain and inverter circuit 42 that receives inputs from the switching node VSW during activation of the low-side FET Q2 and deactivation of the high-side FET Q1 (i.e., during off-times), and measures a low-side output waveform of the low-side FET Q2, which is a voltage waveform (VdsonQ2) across the low-side FET Q2, as illustrated in waveform 70 of FIG. 3. The temperature compensated gain and inverter circuit 42 can include current sources and other components that are tuned to compensate for temperature variation during operation. The temperature compensated gain and inverter circuit 42 also provides gain to the low-side output waveform since this signal is a low voltage level signal (e.g., +/−50 mV). The temperature compensated gain and inverter circuit 42 inverts the low-side output waveform and sets the gain of the signal to substantially match the slope of the actual output current IL, as illustrated in waveform 72 of FIG. 3, through the inductor L1 during the off-time of the switching converter 12.

The temperature compensated, amplified and inverted low-side output waveform is provided to a buffer 43 formed of a first level shifter 44 and a second level shifter 46. The first level shifter 44 provides for a low impedance translation and is configured to shift the signal such that the signal has a negative voltage rail set to a user defined value greater than 0V, so as to provide for the capturing of negative current information. The output of the second level shifter 46 provides a low impedance amplified, inverted version of the low-side output waveform referred to an internally reproduced low-side FET voltage waveform (VdsonGEN) (i.e., IL*Rdson(Q2)), as illustrated in the waveform 74 of FIG. 3. The output of the second level shifter 46 also provides a simulated inductor current waveform (ILGEN), as illustrated in waveform 76 of FIG. 3 that is proportional to the actual inductor output current waveform IL, as illustrated in waveform 72 of FIG. 3. The simulated inductor current waveform (ILGEN) is generated with a waveform generator 50 and a charging capacitor C1.

The waveform generator 50 includes a first control loop 52 that regulates the slopes of the simulated inductor current waveform (ILGEN) with the slopes of the internally reproduced low-side FET voltage waveform (VdsonGEN), such that the first control loop 52 controls the modulation of the charging of the capacitor C1 during on-times. The waveform generator 50 includes a second control loop 54 that regulates the minimum values of the simulated inductor current waveform (ILGEN) with the minimum values of the internally reproduced low-side FET voltage waveform (VdsonGEN), such that the second control loop 54 controls the modulation of the discharging of the capacitor C1 during off-times. The first control loop forces the simulated inductor current waveform (ILGEN) to intersect the actual inductor output current waveform IL in the middle of the defined regulation period, while the second control loops pulls in the simulated inductor current waveform (ILGEN) to match the actual inductor output current waveform IL. The first and second control loops 52 and 54 in conjunction with the charging and discharging of capacitor C1 facilitate the generation of the simulated inductor current waveform (ILGEN) that is proportional to the actual inductor output current waveform IL. The switch S1 is coupled between the second control loop 54 and the charging capacitor C1 and is controlled by a control signal CTRL1, which is derived from a switching signal that controls the switching of the high-side FET and/or the low-side FET.

Figure 3:
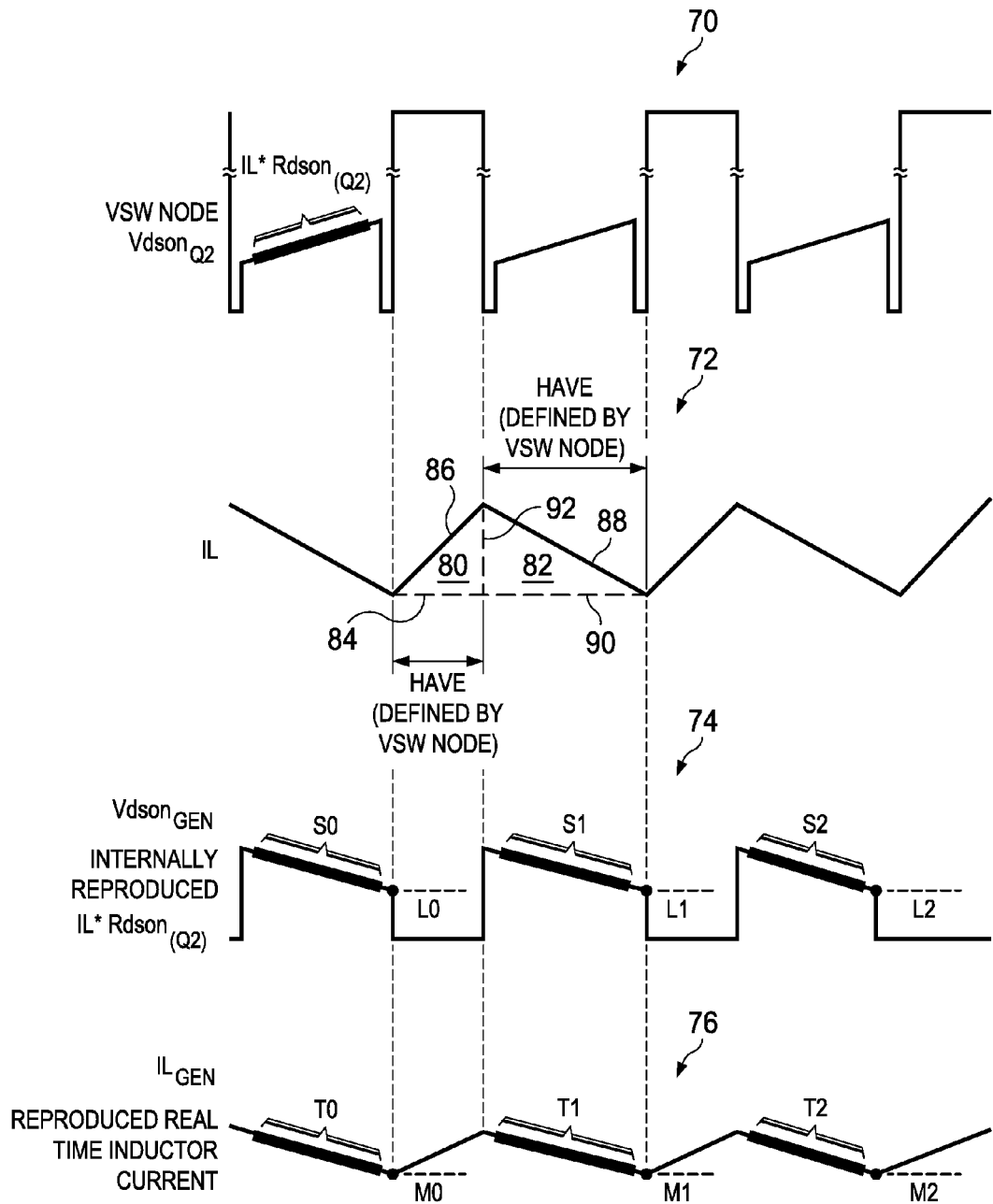
FIG. 3 illustrates exemplary waveforms of the system of FIG. 1 and simulated output generator of FIG. 2 in accordance with an aspect of the present invention.

The first control loop 52 includes a first transconductance amplifier (A1) that receives as inputs the simulated inductor current waveform (ILGEN) and the internally reproduced low-side FET voltage waveform (VdsonGEN) directly from the second level shifter 46. The output of the first control loop 52 is coupled to the charging capacitor C1, which is coupled between the first level shifter 44 and the second level shifter 46, and modulates the charging of the charging capacitor C1. The output of the first transconductance amplifier (A1) is coupled to a transistor Q3, resistor R1 and compensation network capacitor C3 arrangement which is in turn coupled to an arrangement of current sources IC1-IC3, which all cooperate to perform the functions of the first control loop 52. For example, as illustrated in FIG. 3, the first control loop 52 functions to regulate the slopes of T0, T1, T2 of simulated inductor current waveform (ILGEN) 76 with the respective slopes S0, S1 and S2 of the internally reproduced low-side FET voltage waveform (VdsonGEN) 74.

The second control loop 54 includes a second transconductance amplifier (A2) that receives as inputs the sampled minimum values of the simulated inductor current waveform (ILGEN) and the sampled minimum values of the internally reproduced low-side FET voltage waveform (VdsonGEN). The second control loop 54 receives inputs from a sample-and-hold device 48 that includes a first sample-and-hold circuit that samples the simulated inductor current waveform (ILGEN) output from the second level shifter 46 and a second sample-and-hold circuit that samples the internally reproduced low-side FET voltage waveform (VdsonGEN) from the second level shifter 46. The sample-and-hold device 48 is controlled by a control signal CTRL2, which is derived from a switching signal that controls the switching of the high-side FET and/or the low-side FET. In this manner, the first sample-and-hold circuit attempts to sample the simulated inductor current waveform (ILGEN) output at its minimum values and the second sample-and-hold circuit attempts to sample the internally reproduced low-side FET voltage waveform (VdsonGEN) output at its minimum values.

The output of the second control loop 54 is coupled to the charging capacitor C1 through the switch S1 and modulates the discharging of the charging capacitor C1. The output of the second output transconductance amplifier (A2) is coupled to a transistor Q4, resistor R2 and compensation network capacitor C4 arrangement which is in turn coupled to an arrangement of current sources IC4-IC7, which all cooperate to perform the functions of the second control loop 54. For example, as illustrated in FIG. 3, the first control loop 52 functions to regulate the minimum values of M0, M1, M2 of simulated inductor current waveform (ILGEN) 76 with the respective minimum values L0, L1 and L2 of the internally reproduced low-side FET voltage waveform (VdsonGEN) 74.

Operation of the circuit having been shown above, below is an explanation of how and why this control scheme performs the desired control. The timing signals known through the VSW node in effect split the synthesized inductor current to two triangles 80, 82, as shown in FIG. 3 in waveform 72. The first triangle 80 represents the time when transistor Q1 (FIG. 1) is on and the second triangle 82 represents a time when transistor Q2 (FIG. 1) is on. The base of triangle 80 is 84 and a hypotenuse of triangle 80 is 86. The base of triangle 82 is 90 and a hypotenuse of triangle 82 is 88. Referring to triangle 82, the hypotenuse of the triangle is known from the internally reproduced signal $Vdson_{GEN}$ which is measured by multiplying the inductor current $I_L$ by the resistance of the transistor Rdson, as shown in FIG. 3. Since the base of the triangle 90 is known from the timing signal at the VSW node and since the hypotenuse is known as described above, the height of the triangle 92 can be determined. Knowing the height and bases of the two triangles, the missing information, which is the hypotenuse 86 of triangle 80 can be determined.

The information from $Vdson_{GEN}$ shown in FIG. 3 as reference 74, is then translated to $IL_{GEN}$ through the circuit shown in FIG. 2 which contains the slope and Valley control loops by forcing the following conditions, the slope control unit will adjust until T0=S0, T1=S1, and T2=S2, as shown in FIG. 3 by reference numerals 74 and 76; and the valley control loop will adjust until M0=L0, M1=L1 and M2=L2 as shown in FIG. 3 as reference numerals 74 and 76.

One problem that can occur with this control method is that the error can accumulate on a cycle-by-cycle basis. Accordingly, the present invention incorporates a cycle-by-cycle DC reset to null out accumulated error in order to prevent signal "walk-away". At the initial power-on or enabling of the controller, the produced slopes do not yet matched those of the inductor current, which means that the slopes T0≠S0, T1≠S1 and T2≠S2, which also means that the valley signals M0≠L0, M1≠L1 and M2≠L2, see FIG. 3 at reference numeral 74, 76. This in turn can produce an accumulated error which can prevent the control loops from functioning properly.

In order to enable proper operation, after the control loops sample the valley points M0, L0, M1, L1, M2 and L2, a DC reset is performed forcing $IL_{GEN}$ and $Vdson_{GEN}$ to be equal, thus resetting or zeroing the accumulated error for given cycle. This cycle-by-cycle DC reset prevents $IL_{GEN}$ from walking away to the most positive or most negative voltage allowed by the system (VDD or VSS), and providing incorrect information. This is shown by element 508 in FIG.

5, which is discussed below. Circuits for performing this function are well known to those skilled in the art and need not be described in detail here.

Figure 4:
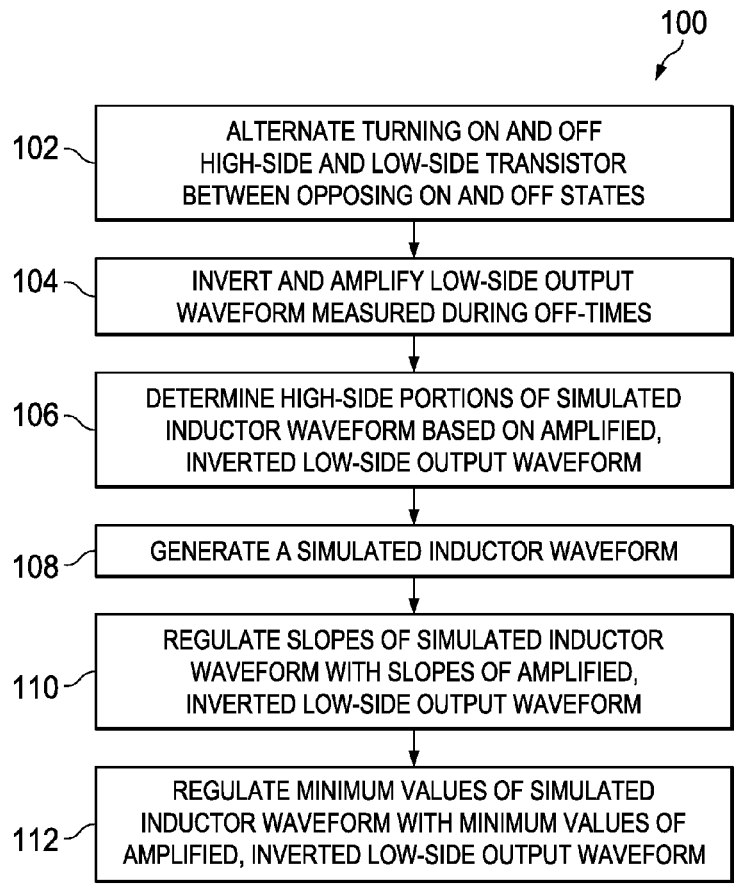
FIG. 4 illustrates a method of regulating a switching converter in accordance with an aspect of the present invention.

In view of the foregoing structural and functional features described above, certain methods will be better appreciated with reference to FIG. 4. It is to be understood and appreciated that the illustrated actions, in other embodiments, may occur in different orders and/or concurrently with other actions. Moreover, not all illustrated features may be required to implement a method.

FIG. 4 illustrates an example of a method 100 for regulating a switching converter that includes a high-side transistor and a low-side transistor both coupled to an output inductor through a switching node. The method begins at 102 where the high-side transistor and the low side-transistor are alternately turned on and off with the high-side transistor being on during on-times and the low-side transistor being on during off-times. At 104, the low-side output waveform of the low-side transistor measured during off-times is inverted and amplified. At 106, a high-side portion of a simulated inductor waveform during on-times is determined based on the amplified, inverted version of the low-side output waveform. At 108, a simulated inductor waveform is generated that is proportional to an actual inductor output waveform through the output inductor based on the amplified, inverted version of the low-side output waveform and the determined high-side portion. The methodology then proceeds to 110. At 110, slopes of the simulated inductor waveform are regulated with the amplified, inverted version of the low-side output waveform. At 112, minimum values of the simulated inductor waveform are regulated with the amplified, inverted version of the low-side output waveform.

Figure 5:
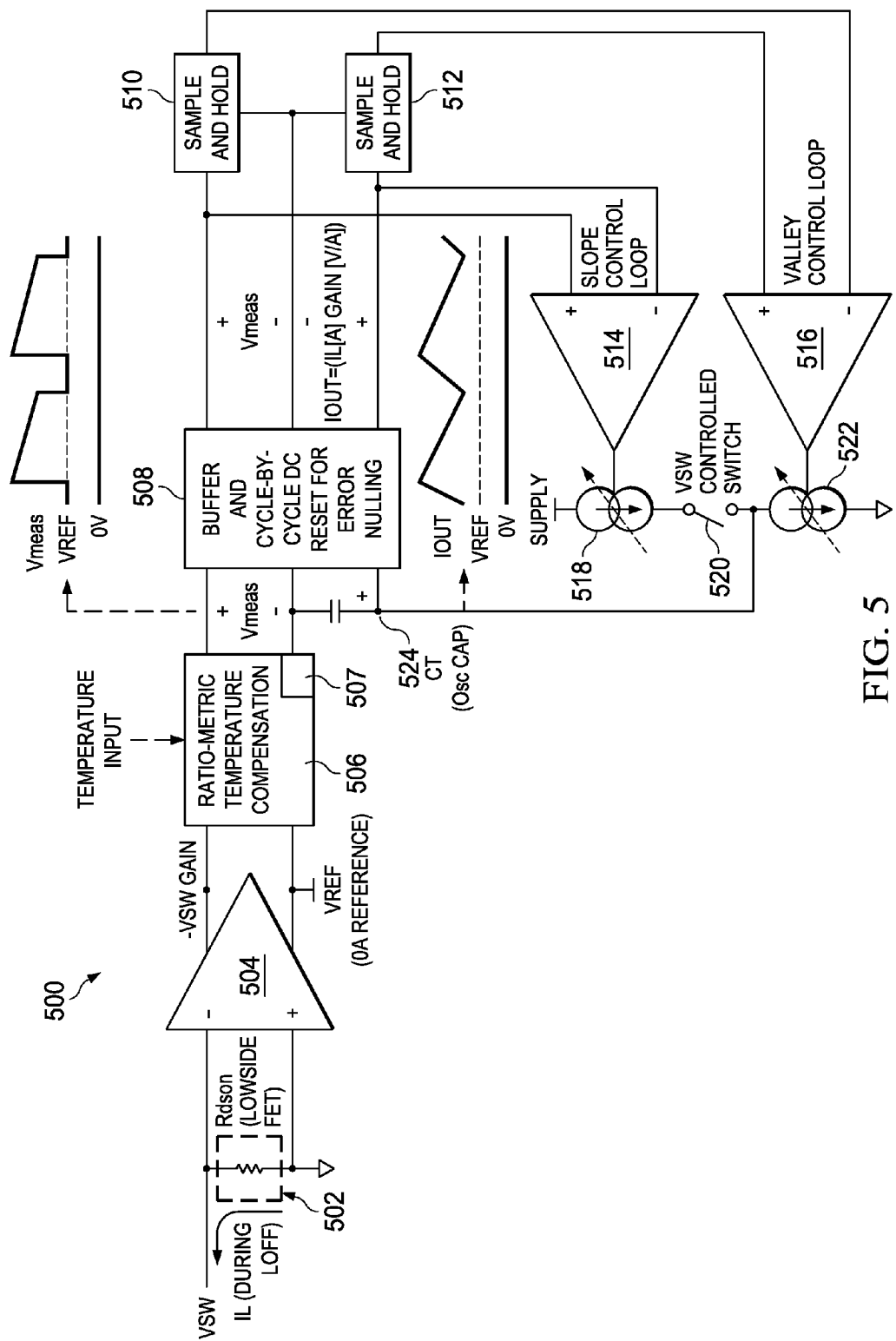
FIG. 5 illustrates a technique for compensating for the temperature coefficient of Rdson constructed according to the principles of the present disclosure.

Another problem which can occur with circuit constructed according to the principles of the present disclosure is that it is dependent upon the proper value for Rdson. As is well known, the Rdson of a MOSFET transistor has a positive temperature coefficient. Therefore, it is important to temperature-compensate the value utilized in order to get an accurate simulated inductor current measurement waveform. If the switching transistors are on the same integrated circuit (IC) as the control circuit, a temperature compensation technique utilizing a look-up table which has the variation of Rdson with IC temperature can be utilized. FIG. 5 shows a circuit for implementing this technique in accordance with the present disclosure, generally as 500. In FIG. 5, the Rdson of the low-side FET 502 is measured by differential amplifier 504, the output of which is fed into the ratio-metric temperature compensation circuit 506. Circuit 506 receives a temperature input of the temperature of the IC and utilizes it to refer to a look-up table 507. The output of ratio-metric temperature compensation circuit 506 is fed to a buffer and cycle-by-cycle DC reset circuit for error 508. The output of buffer 508 is coupled to a sample-and-hold circuit 510 which stores the value of the voltage measurement and sample-and-hold circuit 512 which holds the value related to the output current. The output of sample-and-hold circuits 510 and 512 are coupled to the inputs of the valley control loop comprising error amplifier 516. The measured voltage VMEAS and output current IOUT are also coupled to the inputs of the slope control unit comprising error amplifier 514. The output of error amplifier 516 controls a variable current source 522 and the output of their amplifier 514 controls a variable current source 518. Variable current sources 518 and 522 are in series with a VSW controlled switch 520. The node at the valley control loop is coupled to an oscillation capacitor 524.

In operation, the voltage across Q2 created by the current IL and its internal resistance Rdson is amplified by differential amplifier 504, the output of which is negative with respect to a reference voltage VRef. The differential output of amplifier 504 is coupled to a ratio-metric temperature compensation circuit which receives input of the temperature of the IC and utilizes it to obtain a value from the look-up table 507 as to the variation of Rdson at the measured temperature. This is utilized to increase or decrease the gain of circuit 506 based upon the temperatures, bearing in mind that Rdson has a positive temperature coefficient. Therefore, the output of ratio-metric temperature compensation circuit 506, VMEAS, will not vary with respect to temperature. This voltage is then applied to buffer and cycle-by-cycle DC reset for error nulling circuit 508. The cycle-by-cycle DC reset has been described above. The output of circuit 508 is coupled to sample-and-hold circuit 510 and 512. The voltage VMEAS is coupled to sample-and-hold circuit 510 and a voltage IOUT representative of the inductor current is coupled to sample-and-hold circuit 512. As can be seen by the illustrated waveform, the waveform VMEAS shows a portion of the simulated current signal where the waveform IOUT shows the entire waveform. The slope control loop 514 guarantees that the slopes of the signal $Vdson_{GEN}$ and $IL_{GEN}$ match. The valley control loop 516 guarantees that the amplitudes of the signals M0=L0, M1=L1, and M2=L2. The slope control loop 514 controls variable current source 518 and the valley control loop 516 controls variable current source 522. Switch 520 is open when the low side transistor Q2 is on and closed when the transistor is off. Thus, when this switch is closed, capacitor CT 524 is charged by the difference between current source 518 and 522 and, when the switch is open, capacitor CT is discharged by the current source 522. Thus, the waveform IOUT will be generated across capacitor CT 524.

What have been described above are examples of the invention. It is, of course, not possible to describe every conceivable combination of components or method for purposes of describing the invention, but one of ordinary skill in the art will recognize that many further combinations and permutations of the invention are possible.

Accordingly, the invention is intended to embrace all such alterations, modifications, and variations that fall within the scope of this application, including the appended claims.

What is claimed is:

1. An apparatus comprising:
an input coupled to a switching node of a power supply system;
an output coupled to a driver circuit of the power supply system, wherein the driver circuit is coupled to a high-side transistor and a low-side transistor, and the switching node is coupled between the high-side transistor and the low-side transistor;
a reference node configured to receive a reference voltage;
a first circuit coupled to the input and the reference node, the first circuit configured to generate a measured voltage signal and a simulated current signal based on a switching node voltage during a time period in which the low-side transistor is activated and the high-side transistor is inactivated, the first circuit is configured to deliver the simulated current signal to the output; and
a second circuit coupled to the first circuit, the second circuit having a slope control loop and a valley control loop, the slope control loop configured to match a voltage slope of the measured voltage signal with a current slope of the simulated current signal, and the valley control loop configured to match a voltage valley of the measured voltage signal with a current valley of the simulated current signal.

2. The apparatus of claim 1, wherein the first circuit includes:
   a differential amplifier coupled between the switching node and the low-side transistor;
   a temperature compensation circuit coupled to the differential amplifier;
   a buffer-and-reset circuit coupled to the temperature compensation circuit, the buffer-and-reset configured to deliver the measured voltage signal and the simulated current signal; and
   a capacitor coupled between the reference node and the buffer-and-reset circuit.

3. The apparatus of claim 2, wherein the buffer-and-reset circuit is configured to reset the capacitor when the simulated current signal is complete.

4. The apparatus of claim 1, further comprising:
   a switch coupled between the slope control loop and the valley control loop, the switch configured to couple the slope control loop to the first circuit when the low-side transistor is activated, and the switch is configured to couple the valley control loop to the first circuit when the low-side transistor is inactivated.

5. The apparatus of claim 1, wherein the slope control loop includes:
   an error amplifier having a positive input configured to receive the measured voltage signal, and a negative input configured to receive the simulated current signal; and
   a variable current source adjustable by the error amplifier.

6. The apparatus of claim 1, wherein the valley control loop includes:
   a first sample-and-hold circuit configured to sample and hold the measured voltage signal;
   a second sample-and-hold circuit configured to sample and hold the simulated current signal;
   an error amplifier having a positive input coupled to the second sample-and-hold circuit, and a negative input coupled to the first sample-and-hold circuit; and
   a variable current source adjustable by the error amplifier.

* * * * *